United States Patent
Koss et al.

[19]

[11] Patent Number: 6,147,474
[45] Date of Patent: Nov. 14, 2000

[54] CONTROLLER WITH PHASE VOLTAGE EVALUATION FOR A THREE PHASE GENERATOR

[75] Inventors: Thomas Koss, Reutlingen; Guenter Nasswetter, Gomaringen, both of Germany

[73] Assignee: Robert Bosch GmbH, Stuttgart, Germany

[21] Appl. No.: 09/269,122

[22] PCT Filed: May 8, 1998

[86] PCT No.: PCT/DE98/01280

§ 371 Date: Mar. 19, 1999

§ 102(e) Date: Mar. 19, 1999

[87] PCT Pub. No.: WO99/07064

PCT Pub. Date: Feb. 11, 1997

[30] Foreign Application Priority Data

Jul. 31, 1997 [DE] Germany .......................... 197 32 961

[51] Int. Cl.[7] ..................................................... H02P 9/10
[52] U.S. Cl. ............................................... 322/59; 322/28
[58] Field of Search .................................. 322/20, 25, 27, 322/28, 29, 59, 61, 99

[56] References Cited

U.S. PATENT DOCUMENTS

| | | | |
|---|---|---|---|
| 5,182,511 | 1/1993 | Pierret et al. | 324/158 MG |
| 5,602,470 | 2/1997 | Kohl et al. | 324/177 |
| 5,629,606 | 5/1997 | Asada | 322/28 |
| 5,731,689 | 3/1998 | Sato | 322/25 |
| 5,748,463 | 5/1998 | Tsutsui et al. | 363/127 |
| 5,754,031 | 5/1998 | Kanazawa et al. | 322/28 |
| 5,808,451 | 9/1998 | Rndou et al. | 322/24 |
| 5,900,722 | 5/1999 | Scott et al. | 322/46 |
| 5,929,610 | 7/1999 | Freedlander et al. | 322/37 |

*Primary Examiner*—Nick Ponomarenko
*Attorney, Agent, or Firm*—Michael Striker

[57] ABSTRACT

A voltage controller for a three-phase generator is disclosed in which the phase voltage of the generator is evaluated. This phase voltage is evaluated with the aid of a window comparator with variable thresholds. Via a VCL signal, which switches over each time a threshold adaptation occurs, a frequency-dependent signal can be generated that can be evaluated as a measure for the generator rpm.

7 Claims, 3 Drawing Sheets

CONTROLLER WITH PHASE VOLTAGE EVALUATION FOR A THREE PHASE GENERATOR

The invention is based on a controller with phase voltage evaluation for a three-phase generator having a plurality of phase windings and one exciter winding, as generically defined by the preamble to the main claim.

PRIOR ART

In motor vehicles, to generate electrical energy, three-phase generators are typically used, whose output voltage can be regulated with the aid of a voltage controller by suitably varying the exciting current to constant values. In conventional three-phase generators, the exciting current is furnished via the exciter diodes. In three-phase generators in which the generator controller, to save on the exciter diodes, is operated directly at the battery supply terminal B+, a detection circuit is needed, which is capable of distinguishing between a generator that is rotating and one that is stopped. This distinction is necessary, because when generator rotation is detected, the controller must switchover from a preexcitation state to the actual control state. To detect whether the generator is rotating or is stopped, the voltage appearing at a phase terminal of the generator, for instance, can be evaluated. This voltage comprises a direct voltage component, which is determined substantially for instance by residual currents of the rectifier diodes and the load resistance through the phase voltage circuit, and an alternating voltage component superimposed on it, whose amplitude depends on the excitation and rpm of the generator, and whose frequency correlates directly with the rotational frequency of the generator.

To achieve reliable evaluation of generator rotation at the onset of generator rotation, it is necessary to evaluate a signal with low AC amplitude at an unknown DC potential.

Until now, methods were employed in which a compensation of the residual currents and thus of the DC component were accomplished by means of a current sink. This method does not attain the requisite operational reliability, however, because on account of aging and soiling, no practicable limit value for this current sink exists.

A current arrangement for measuring the rpm of an externally excited three-phase generator, or for detecting whether the generator is rotating or stopped, is described for instance in German Patent Disclosure DE-OS 43 27 485. In this known current arrangement, the phase voltage picked up at a phase winding, which has an rpm-dependent alternating voltage component, is evaluated for rpm determination. To improve the resolution or to increase the reliability of detection of the onset of generator rotation, a different phase winding is connected to ground via a resistor. This creates a voltage divider, at which the concatenated voltage between the two phase windings is located. This concatenated phase voltage is higher than a phase voltage alone, and therefore makes more-reliable detection of generator rotation possible. The onset of rotation is detected when the concatenated phase voltage exceeds a predeterminable threshold value.

From European Patent Disclosure EP 0 408 436, a voltage controller is known that includes a circuit which evaluates two different phase voltages of the three-phase generator. From the difference between the two phase voltages, the rpm of the three-phase generator is ascertained. The onset of generator rotation can be detected relatively fast; however, the known voltage controller has the disadvantage that two phase terminals are required.

ADVANTAGES OF THE INVENTION

The controller of the invention with phase voltage evaluation for a three-phase generator as defined by the characteristics of claim 1 has the advantage over the known versions that an especially reliable and malfunction-proof evaluation of the phase voltage and taking into account of the ascertained phase voltage in generator control is possible, which is advantageously not impeded by the direct voltage level that may be present. An especially advantageous aspect is that only one phase voltage is evaluated, and thus a second phase terminal can be omitted.

These advantages are attained in that a phase signal of the generator is evaluated, and this phase signal is evaluate with the aid of a window comparator; the upper and lower threshold are each varied in such a way that if the voltage is increasing, reaching the upper threshold leads to an increase in these thresholds, and if the voltage is dropping and the lower threshold is reached, these thresholds are lowered. The two switching points are utilized to form a frequency-dependent evaluation signal, and from the frequency thus ascertained, the rpm of the generator is ascertained.

Further advantages of the invention are attained by means of the characteristics recited in the dependent claims. These dependent claims extend in particular to advantageous embodiments of the voltage followup for the upper or lower threshold. With the aid of the generator rpm ascertained from the phase voltage, optimal voltage control can be achieved, because first it can quickly be determined whether the generator is still at a stop or is rotating, so that immediately after the onset of rotation, a changeover from the preexcitation to the actual control state can be made. During the actual control state, the generator rpm can be taken into account in any case.

DRAWING

One exemplary embodiment of the invention is shown in the drawing and will be described in further detail below. Individually.

DESCRIPTION OF THE EXEMPLARY EMBODIMENT

Figure 1:
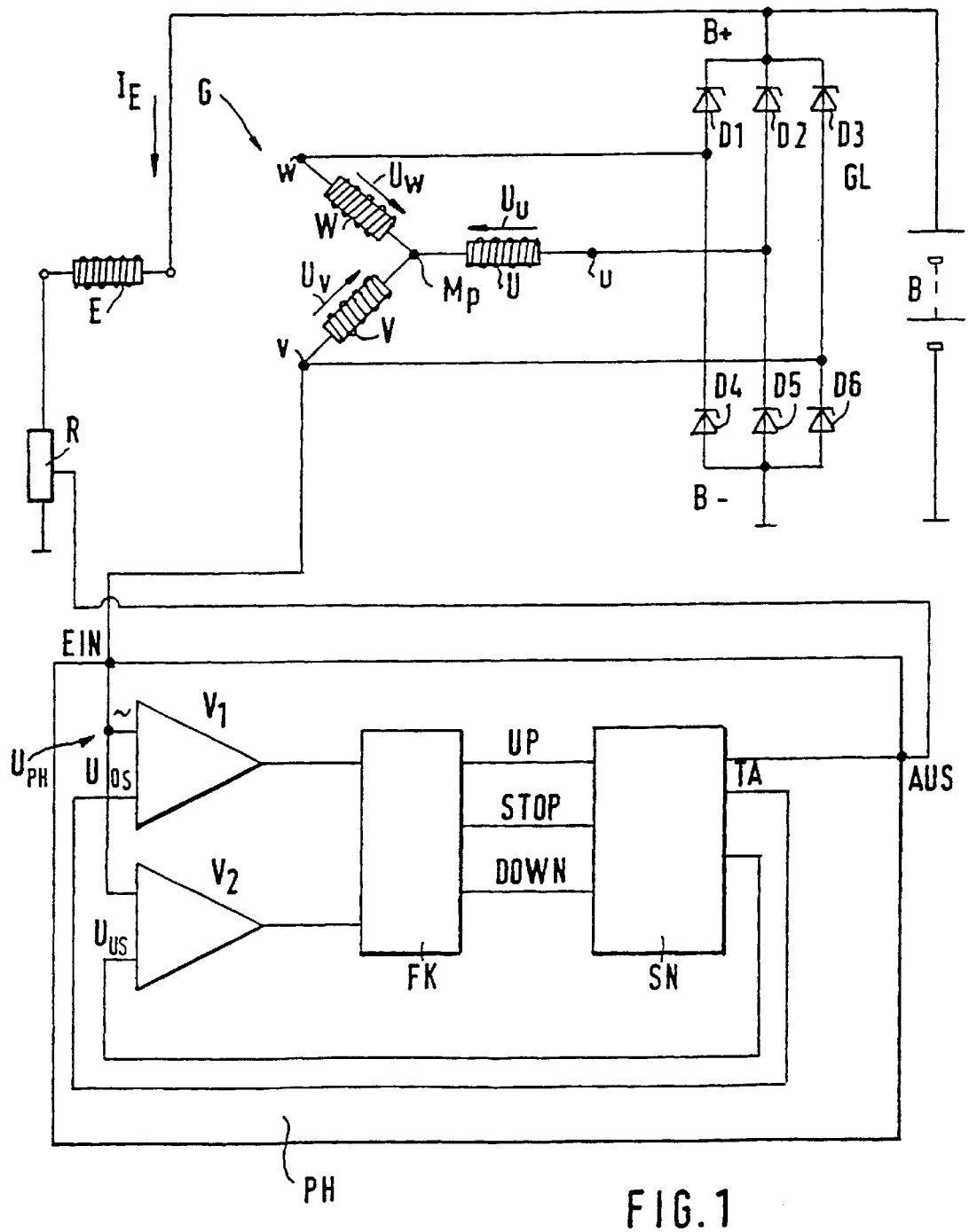
FIG. 1, shows the components of a three-phase generator that are essential to the invention, in conjunction with an on-board vehicle electrical system and the phase voltage evaluation.

FIG. 1 shows a three-phase generator G with the phase windings U, V and W, which are connected to one another at a common center point Mp. The phase windings U, V and W are connected via the terminals u, v and w to the diodes or Zener diodes D1–D6 of the rectifier bridge GL. The rectifier bridge GL is connected to the positive pole of the battery B via the terminal B+, and to the negative pole of the battery B or to ground via the terminal B−. The phase voltages $U_u$, $U_v$ and $U_w$ come about at the phase windings U, V and W. One of the phase voltages, such as $U_v$, is to be evaluated in order both to detect the onset of generator rotation and to determine the generator rpm.

The evaluation of the phase voltage is effected in circuit block PH, which may be embodied either as a separate circuit or as a component of the voltage controller R, but in either case is connected to the voltage controller R. In the usual way, the voltage controller R varies the exciting current $I_E$, which flows through the exciter winding E of the generator. The exciter winding E, in the exemplary embodiment shown in FIG. 1, is connected directly to the terminal B+ of generator, and thus to the positive pole of the battery B. In this kind of generator system, exciter diodes are not required. For evaluation of the phase voltage, the phase voltage $U_{PH}$ is delivered to the block PH via the input EIN.

The circuit block PH comprises two comparators $V_1$ and $V_2$, which together with the block $F_K$ form a window comparator. In the comparators $V_1$ and $V_2$, the phase voltage $U_{PH}$ is compared with an upper threshold $U_{OS}$ and a lower threshold $U_{US}$. If the phase voltage is higher than the upper threshold $U_{OS}$, the window comparator trips a counting operation UP, which via the block SN in which a voltage followup is performed causes a voltage increase. Then both the upper threshold and the lower threshold are raised. If the phase voltage comparison in the window comparator shows that the phase voltage is within the window region, the window comparator outputs a stop signal, and the voltage followup is then suppressed. If the phase voltage is above a lower threshold $U_{US}$, the window comparator outputs a down signal, and by means of the voltage followup both the upper and the lower thresholds are lowered. At the clock output TA of the voltage followup SN, a square-wave signal is output that upon each initiation of voltage followup changes its level and in the final analysis contains information about the generator rpm; this information can be evaluated and delivered for instance to the voltage controller, whereupon the voltage controller sets its control strategy in accordance with the rpm ascertained. The precise switchover conditions for the voltage followup will be described in further detail below in conjunction with FIG. 4.

Figure 2:
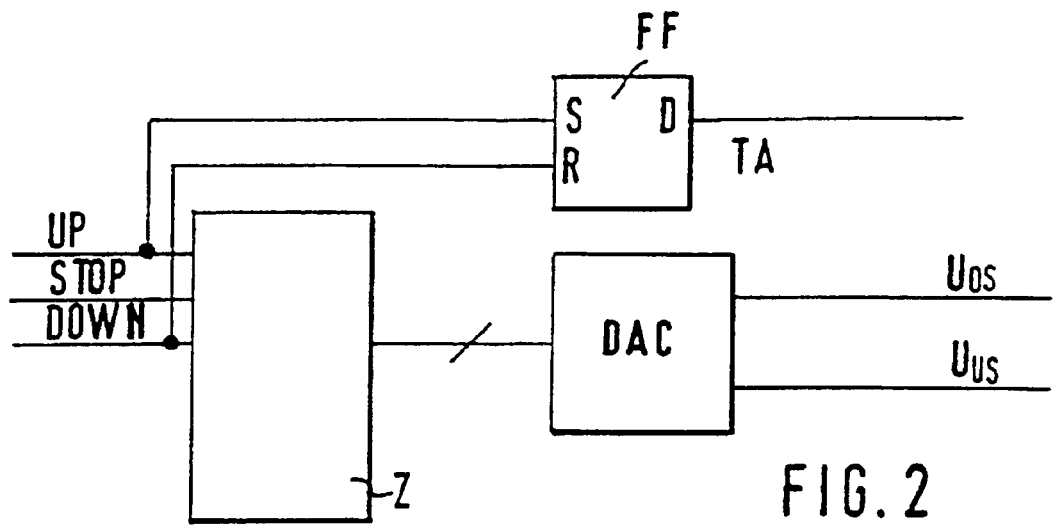
FIGS. 2 and 3 shows two circuitry options for the voltage followup.
Figure 3:
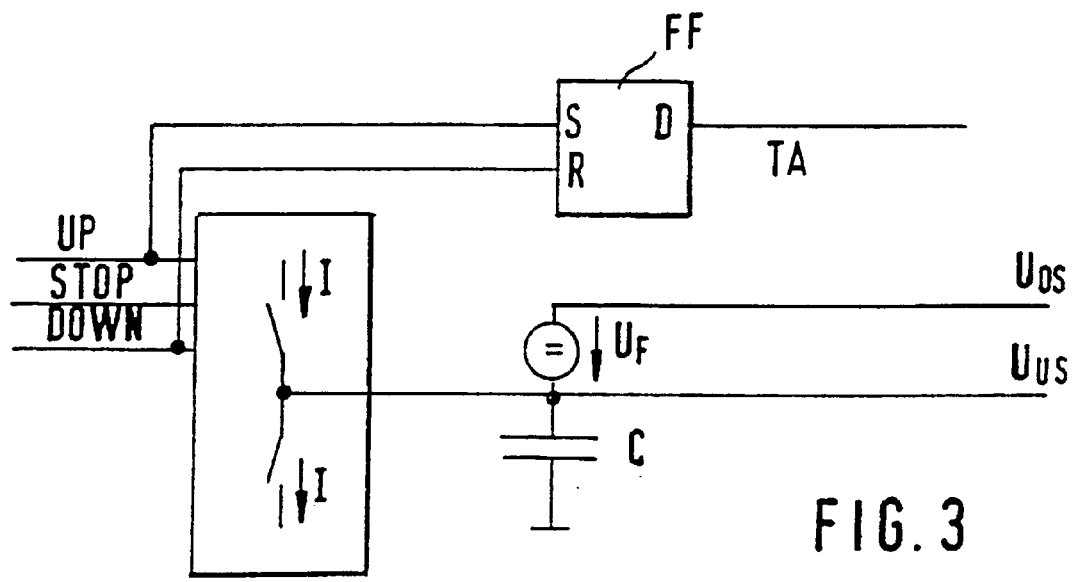

In FIGS. 2 and 3, two versions of the voltage followup SN are shown. In the first example in FIG. 2, an n-bit up-down counter Z is present, which is triggered by the window comparator with the signals Up, Stop, and Down. Depending on the triggering, the counter accordingly counts upward or downward or stays at a constant counting value. The counter state of the counter Z is converted in the digital/analog converter DAC into an analog voltage, which determines the upper and lower thresholds $U_{OS}$ and $U_{US}$. If the phase voltage exceeds the upper comparator threshold, the counting direction of the counter Z is set to Up, and the counter state and thus the auxiliary voltage are raised, via a fixed clock rate, enough that the phase voltage is again below the upper threshold. A switchover of the counting direction to Down is not done until the phase voltage is below the lower threshold; it should be noted that the lower threshold has previously been set high. The voltage followup can be said to generate an auxiliary voltage, and the auxiliary voltage is superimposed on both thresholds in order to shift the thresholds.

The aforementioned threshold switchover can be explained as follows, with reference to FIG. 4: If the phase voltage reaches the upper threshold $U_{OS}$, the upper threshold is set high, because the window comparator causes the counter to count upward. At the same time, via the voltage followup, the lower threshold is also set high, but in region 1 the lower threshold is raised less markedly, because the circuit is at its lower stop. Once the phase voltage $U_{PH}$ has dropped to a value equivalent to the lower threshold $U_{US}$, the two thresholds are switched back again to their original value. The next time the upper threshold is reached by the phase voltage, the thresholds are set high again, and then reset again when the lower threshold is reached.

When the thresholds are set high, the set input of the flip-flop ff, which is connected to the Up input of the counter A, is set. On switching back, a flip-flop FF is reset. At the output of the flip-flop FF, a VCL evaluation signal TA is thus obtained, whose pulse intervals (for instance, the trailing edges are evaluated in each case) is an accurate measure of the frequency of the phase voltage. The evaluation signal TA changes its level each time there is a change of a threshold.

Figure 4:
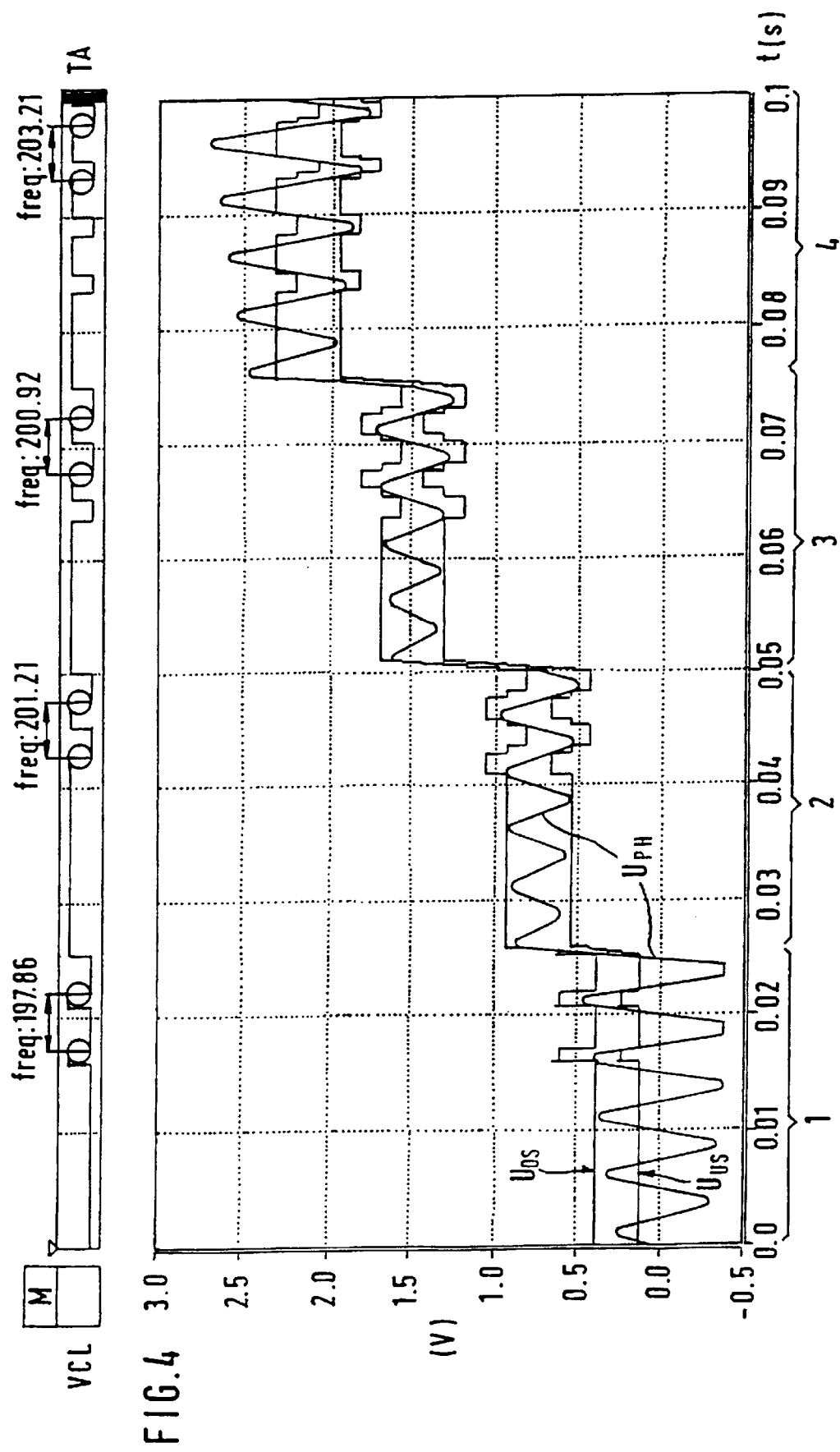
FIG. 4 shows simulated signal courses for various conditions.

In regions 2, 3 and 4 of FIG. 4, examples are shown for which the phase voltage trips a threshold shift each time the upper threshold and the lower threshold are reached. In region 2, the upper threshold is reached first, and after it has been reached both thresholds are raised. If the phase voltage drops back down to the lower threshold, both thresholds are lowered to their original value, and when the lowered threshold is reached the counter Z receives a Down signal, and as a result both thresholds are lowered by the same value. Threshold shifts are thus tripped in principle each time the phase voltage reaches one of the thresholds.

In the signal course shown in region 3, the phase voltage reaches the lower threshold first. As a result, the counter is first supplied with a Down signal, and it counts downward, causing both thresholds first to be lowered. Once the upper, reduced threshold is reached, a switch back to the original threshold is made, and when that threshold is reached, a further increase in the threshold takes place; in each case, the upper and lower thresholds are changed by the same amount.

In the region marked 4, the circuit is at its upper stop. The phase signal is then at such a high direct voltage level that no further increase in the threshold can occur; the only possibility is a further reduction when the lower threshold is reached. Even so, an evaluation of the VCL signal TA is still possible.

From the VCL signal TA, as already explained, it can be told on the one hand whether the generator is rotating or is at a stop. By measuring out the chronological spacing of identical edges of the VCL signal, the rpm of the generator can be determined. If this information is delivered to the controller, the controller can take the generator rpm into account as well in the control process.

FIG. 3 shows a second possibility for voltage followup; the generation of the evaluation signal TA is the same as in the example of FIG. 2. In this version, the counter is replaced with a current source that can be added. If an Up signal is output by the window comparator, the capacitor C is charged by the delivery of a current I, and the lower threshold is raised. The difference between the lower and upper thresholds is kept constant with the aid of a voltage source which furnishes a voltage $U_F$; that is, the upper threshold is raised to the same extent as the lower threshold. If the window comparator outputs a Down signal, the capacitor C is correspondingly discharged, and the thresholds are lowered. As long as a Stop signal is present, the thresholds remain constant.

If the phase voltage evaluation of the invention is used in general for evaluating a periodic voltage, it is advantageously possible to distinguish the alternating component from a direct voltage component that may be present, and it is then possible to evaluate purely the alternating voltage. Using a voltage evaluation in this way would be possible for instance with sensors that have periodic output signals, such as crankshaft/camshaft sensors that scan rotating toothed disks.

What is claimed is:

1. A voltage controller for a three-phase generator having phase windings and one exciter winding, having means for detecting and evaluating at least one phase voltage and taking the detected phase voltage into account in the control of the exciting current flowing through the exciter winding, characterized in that the phase voltage is delivered to a window comparator, whose thresholds are variable; that a threshold change takes place when the phase voltage reaches one of the thresholds, and an output signal is generated that is dependent on the frequency of the phase voltage and in particular that changes its level each time a threshold changes.

2. The voltage controller for controlling a three-phase generator of claim 1, characterized in that the rpm of the generator is ascertained from the interval between identical signal edges of the output signal (VCL).

3. The voltage controller for controlling a three-phase generator of claim 1, characterized in that the voltage followup for the thresholds of the window comparator is effected with the aid of a voltage followup circuit, and the voltage followup circuit receives trigger signals from the window comparator that cause a voltage increase, keep the voltage constant, or cause a voltage reduction.

4. The voltage controller for controlling a three-phase generator of claim 3, characterized in that the voltage followup circuit includes a counter, which receives the trigger signals Up, Stop, Down from the window comparator, and its counter state is evaluated with the aid of a digital/analog converter to generate an auxiliary voltage, and the auxiliary voltage affects the upper and lower threshold of the window comparator.

5. The voltage controller for controlling a three-phase generator of claim 3, characterized in that the voltage followup circuit includes two switching means, by way of which a capacitor can be charged by the delivery of a current, or by removal of a current or kept at constant potential.

6. The voltage controller for controlling a three-phase generator of claim 5, characterized in that a constant voltage source is present, which is connected to the capacitor and is designed such that at the connection point between the constant voltage source and the capacitor, the lower threshold voltage can be picked up, while the upper voltage threshold can be picked up on the opposite side of the constant voltage source.

7. The voltage controller for controlling a three-phase generator of claim 1, characterized in that a flip-flop is present, whose S input is set when an Up trigger signal is generated, whose R input is triggered when a Down signal is generated, and at whose D clock output the output signal that can be evaluated as a VCL signal for ascertaining the rpm of the generator appears.

* * * * *